United States Patent

Nguyen et al.

Patent Number: 5,861,899
Date of Patent: *Jan. 19, 1999

[54] WIDE-SWATH PRINTER/PLOTTER USING MULTIPLE PRINTHEADS

[75] Inventors: Michael A. Nguyen, Singapore, Singapore; Lowell J. Stewart, Poway, Calif.; Daniel S. Kline, Carlsbad, Calif.; Robert A. Boeller, Poway, Calif.; Chuong C. Ta; Robert D. Haselby, both of San Diego, Calif.

[73] Assignee: Hewlett-Packard Company, Palo Alto, Calif.

[ * ] Notice: The term of this patent shall not extend beyond the expiration date of Pat. No. 5,488,397.

[21] Appl. No.: 556,728

[22] Filed: Nov. 13, 1995

Related U.S. Application Data

[63] Continuation of Ser. No. 787,297, Nov. 4, 1991, Pat. No. 5,488,397, which is a continuation-in-part of Ser. No. 786,146, Oct. 31, 1991, Pat. No. 5,241,325.

[51] Int. Cl.⁶ ................................. B41J 2/01; B41J 2/07
[52] U.S. Cl. ............................................. 347/40; 400/82
[58] Field of Search .................... 347/40, 42, 19, 347/49, 43, 14, 104, 50, 160; 346/139 R, 139 C; 400/175, 82, 124, 27; 101/123

[56] References Cited

U.S. PATENT DOCUMENTS

| | | | |
|---|---|---|---|
| 4,528,576 | 7/1985 | Koumura et al. | 347/15 |
| 4,833,491 | 5/1989 | Rezanka | 347/43 |
| 4,855,752 | 8/1989 | Bergstedt | 347/41 |
| 4,878,063 | 10/1989 | Katerberg | 347/19 |
| 4,940,998 | 7/1990 | Asakawa | 347/37 |
| 5,049,898 | 9/1991 | Arthur et al. | 347/49 |
| 5,208,610 | 5/1993 | Su et al. | 347/49 |
| 5,488,397 | 1/1996 | Nguyen et al. | 347/40 |

FOREIGN PATENT DOCUMENTS

| | | | |
|---|---|---|---|
| 379151 | 8/1990 | European Pat. Off. | 347/49 |
| 1-208143 | 8/1989 | Japan . | |
| 2006141 | 1/1990 | Japan . | |

*Primary Examiner*—N. Le
*Assistant Examiner*—Charlene Dickens
*Attorney, Agent, or Firm*—David S. Romney

[57] ABSTRACT

Greater throughput is possible by using wider print swaths in each traverse across printing media. Multiple print cartridges are mounted to be offset from each other in the media scan direction (X-axis). The amount of offset is adjustably varied by selective on/off control of individual printing elements as well as by relative mechanical movement of the print cartridges.

17 Claims, 16 Drawing Sheets

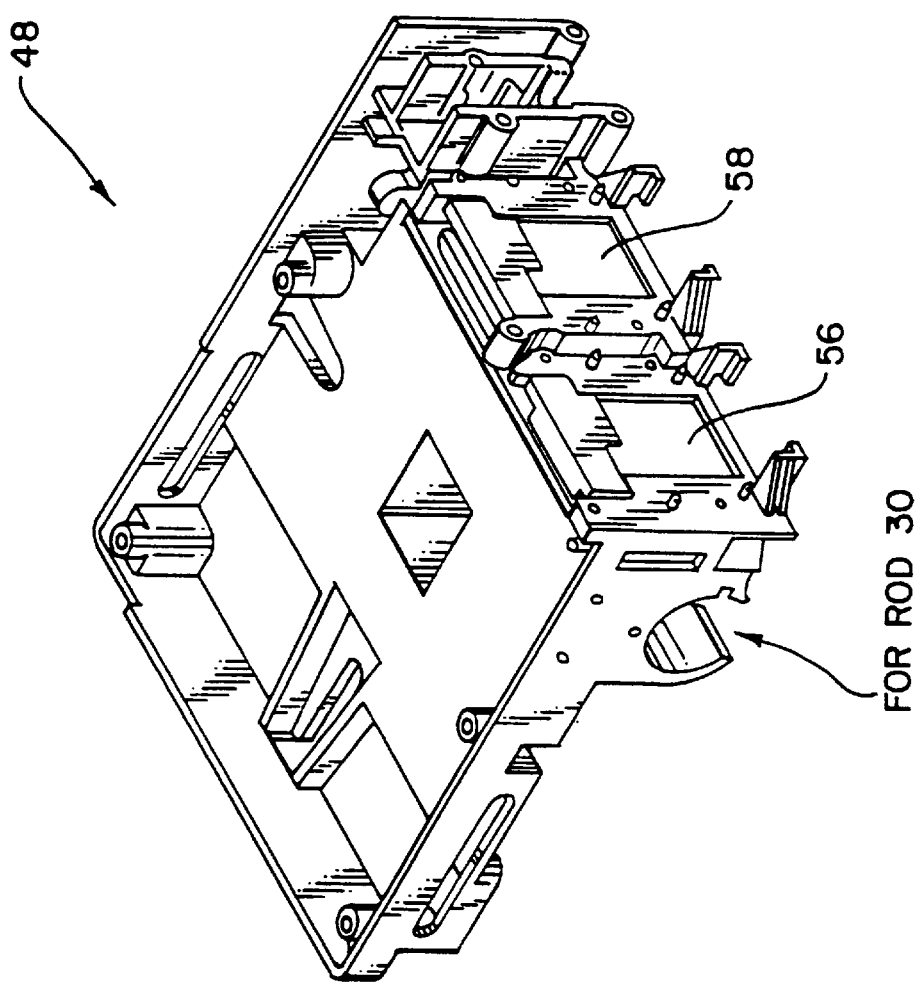

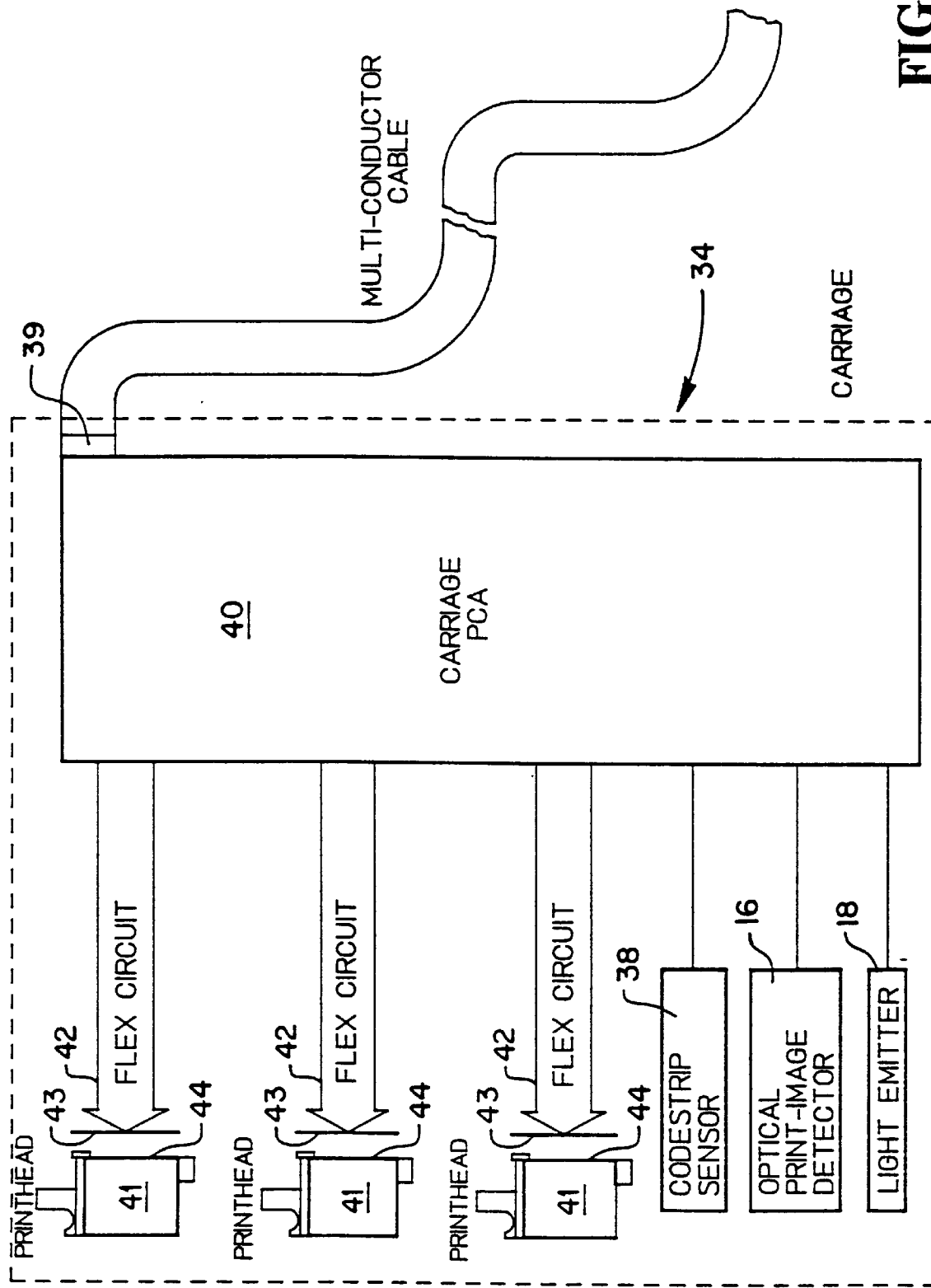

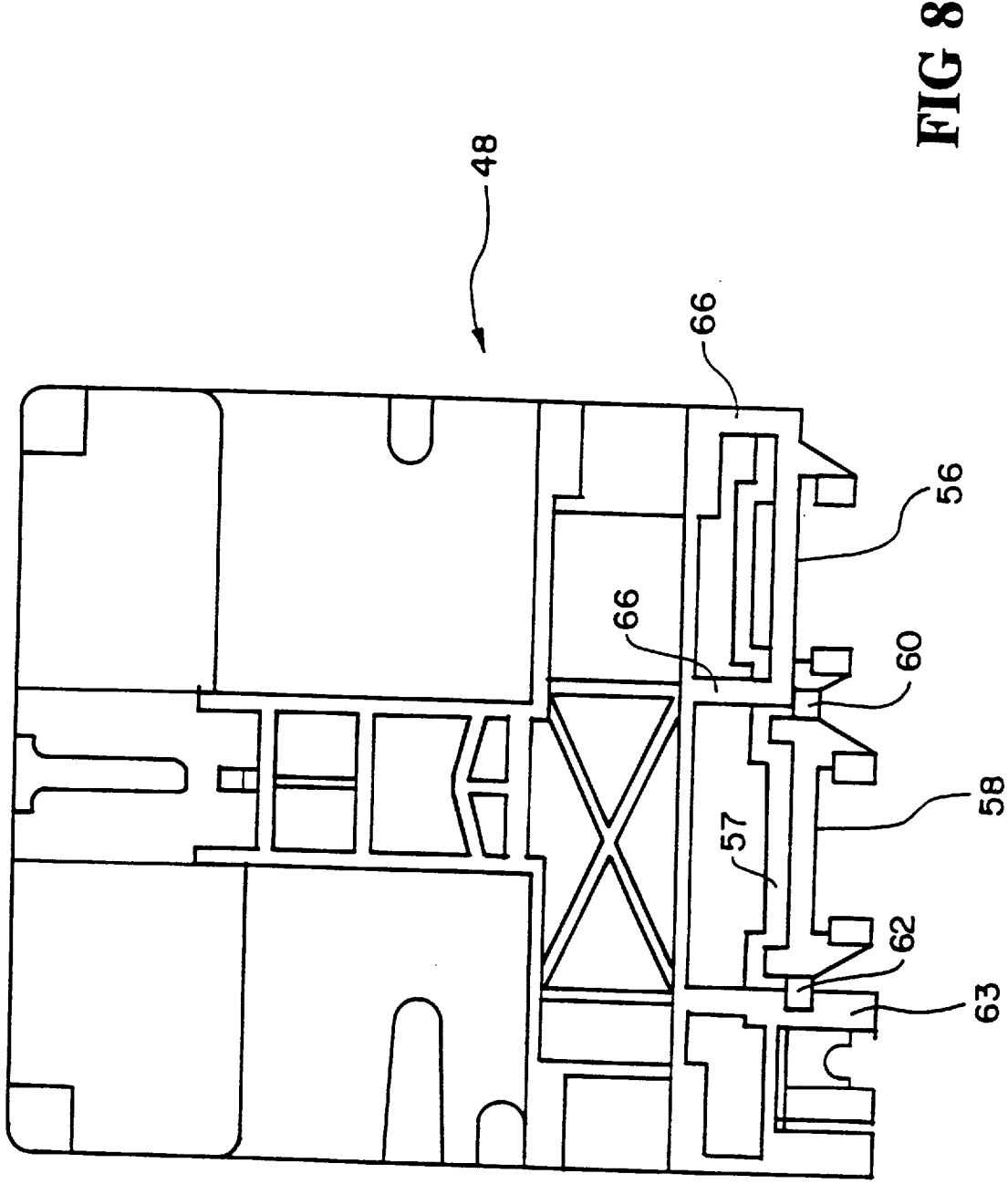

5,861,899

WIDE-SWATH PRINTER/PLOTTER USING MULTIPLE PRINTHEADS

This application is continuation of Ser. No. 07/787,297 entitled Wide-Swath Printer/Plotter Using Multiple Printheads filed Nov. 4, 1991, now U.S. Pat. No. 5,488,397, which is a continuation-in-part of Ser. No. 07/786,146 entitled Print Cartridge Cam Actuator Linkage filed Oct. 31, 1991, now U.S. Pat. No. 5,241,325. This application also relates to copending application Ser. No. 07/786,145 entitled Automatic Print Cartridge Alignment Sensor System filed in the name of Haselby, now U.S. Pat. No. 5,289,208, and copending application Ser. No. 07/785,650 entitled Print Cartridge Alignment In Paper-Axis filed in the names of Nguyen and Haselby, now U.S. Pat. No. 5,297,017 all of which were filed on Oct. 31, 1991 and are commonly owned by the assignee of this application and are incorporated herein by reference.

BACKGROUND OF THE INVENTION

This invention relates generally to printers and plotters, and more specifically to printheads such as thermal inkjet cartridges mounted on a carriage which traverses back and forth across media in either sheet or roll form.

Thermal inkjet printers/plotters typically mount removable print cartridges on a carriage for traversing back and forth across a sheet of media which is periodically advanced along the media movement axis (typically called the X-axis). When the printer/plotter is used for monochrome printing, a single print cartridge is used, and the width of a printing swath is determined by the actual width of the nozzle portion of the print cartridge. When the printer/plotter is used for color printing, one or more additional print cartridges are mounted on the carriage. However, such additional cartridges have been mounted for straight-line alignment with each other along the carriage axis (typically called the Y-axis), and therefore the swath width is still determined by the actual width of the nozzle portion of the print cartridge. In some instances a single print cartridge may have multiple nozzle sets. For example, in the PaintJet family of thermal inkjet printers of Hewlett-Packard Company, the black print cartridge has three nozzle sets which provide a wider printing swath than the corresponding color print cartridge which can be mounted alongside the black print cartridge in a straight-line alignment in the Y direction.

When thermal inkjet printing is used in large format printers/plotters, the throughput limitation due to swath width makes it difficult to compete with more expensive printers/plotters such as laser printers, electro-static plotters and the like. Accordingly, there is a need to provide a large format printer/plotter which increases throughput without having to design a new enlarged print cartridge.

BRIEF SUMMARY OF THE INVENTION

Accordingly, the present invention provides an improved printer/plotter which mounts multiple print cartridges on the same carriage so that the print cartridges are offset from each other in the direction of the media axis (X-axis), with one of the cartridges being fixedly mounted and the others being adjustably mounted relative to the fixedly mounted cartridge. The invention provides for both electronic adjustment through selective on/off control of individual nozzles as well as mechanical adjustment through actual movement of one or more individual pen cartridges. The amount of such adjustment needed is determined from image position data obtained by an on-board printer-image sensor in conjunction with carriage position data obtained by an on-board codestrip sensor.

BRIEF DESCRIPTION OF DRAWINGS

FIG. 4A is a left front view of a carriage shell.

FIG. 6 is a block diagram for the present invention showing the functional circuitry for three substantially identical print cartridges offset from each other in the X direction on the carriage;

FIG. 8 is a bottom view of the carriage shell of FIG. 7A;

DETAILED DESCRIPTION OF PREFERRED EMBODIMENT

Figure 5A:
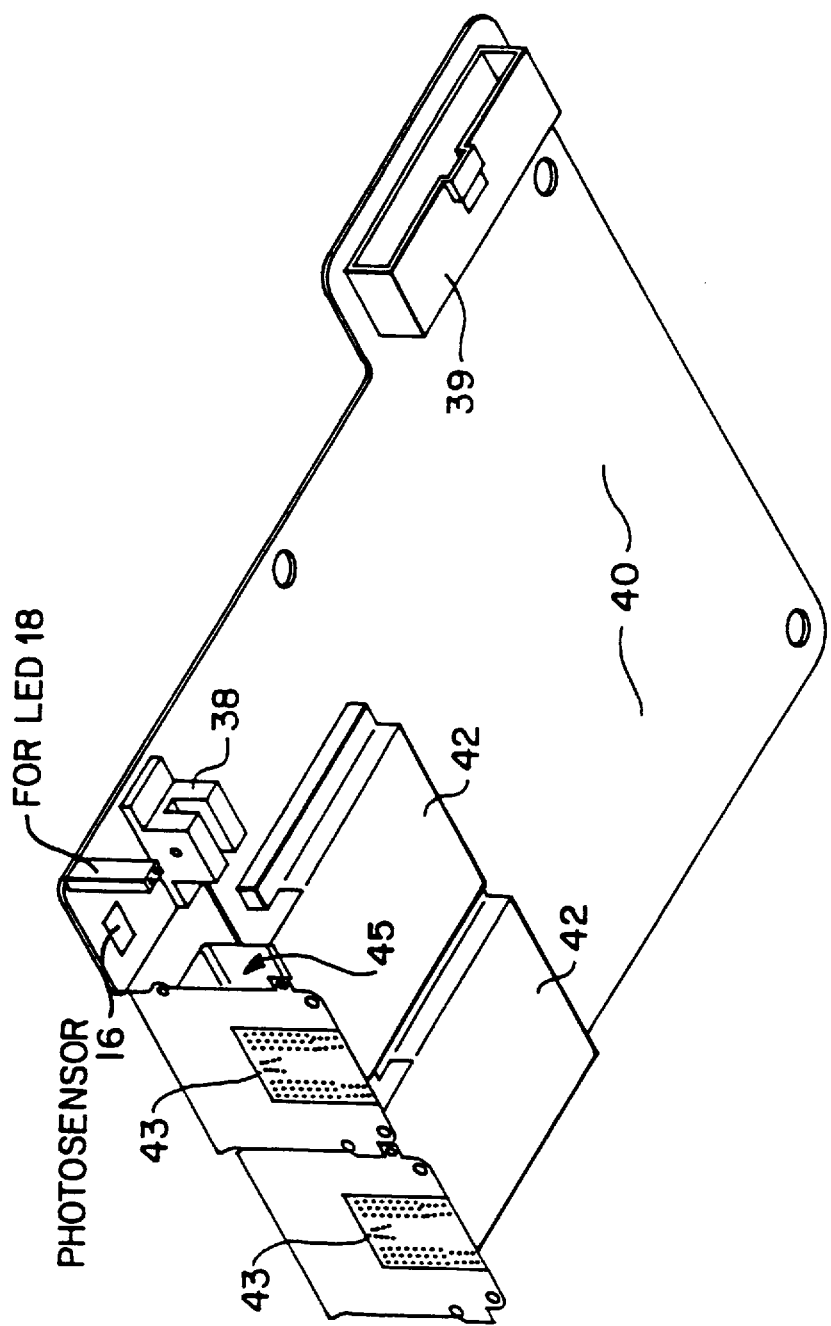
FIGS. 5A and 5B are bottom views of a carriage printed circuit board showing the mounting position of two print cartridge flex circuits, a light emitter, an optical print-image sensor, and a codestrip sensor.
Figure 5B:
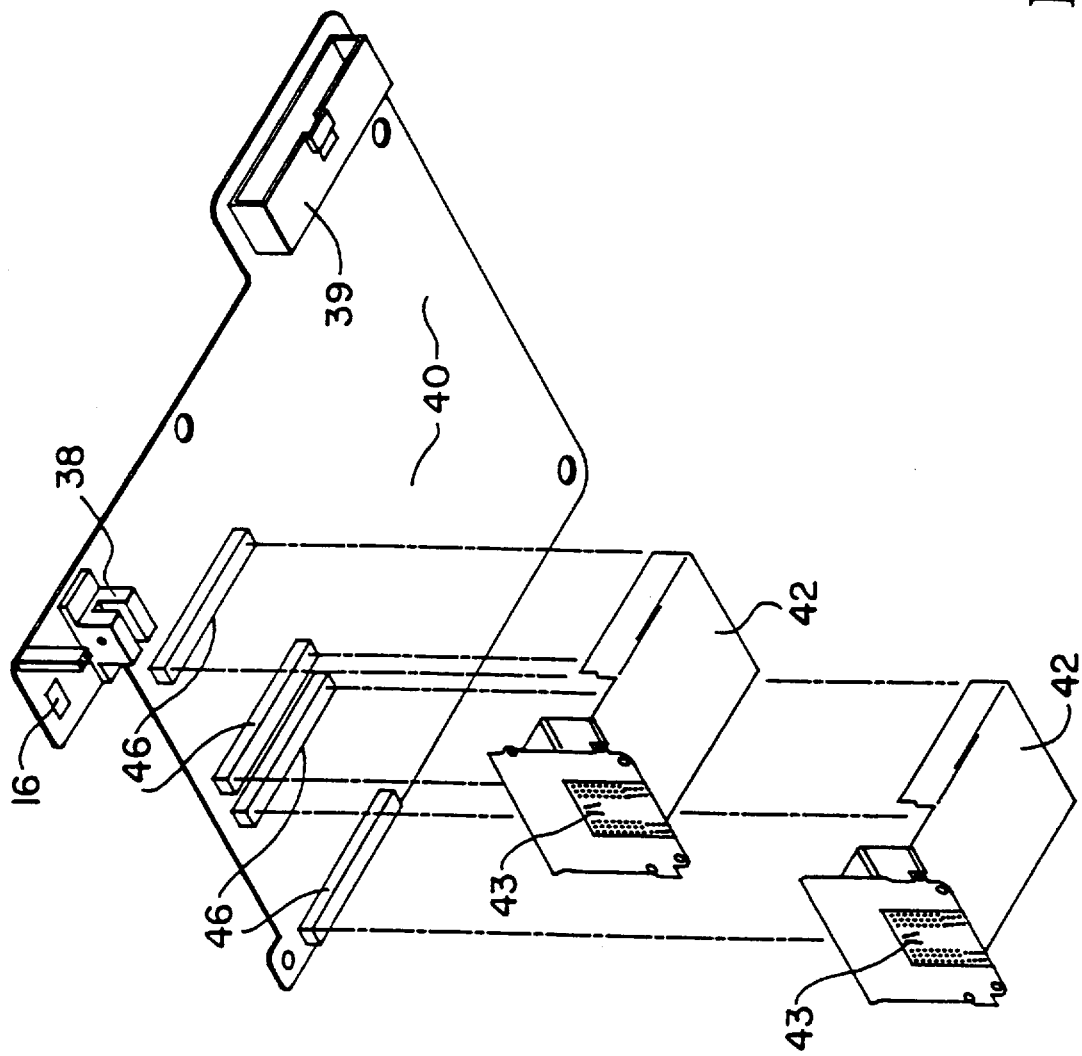

In order to facilitate the solution of alignment problems between multiple print cartridges mounted on the same carriage, the preferred embodiment of the present invention includes a photosensor 16 mounted on the carriage which monitors the actual location of print-images on the media as illuminated by a light source 18 such as an LED (see FIGS. 5A and 5B). A detailed description of such a print-image monitoring system is found in copending application Ser. No. 07/786,145 entitled AUTOMATIC PRINT CARTRIDGE ALIGNMENT SENSOR SYSTEM filed Oct. 31, 1991 in the name of Haselby, which application is assigned to the assignee of the present application and is incorporated herein by reference.

Figure 1:
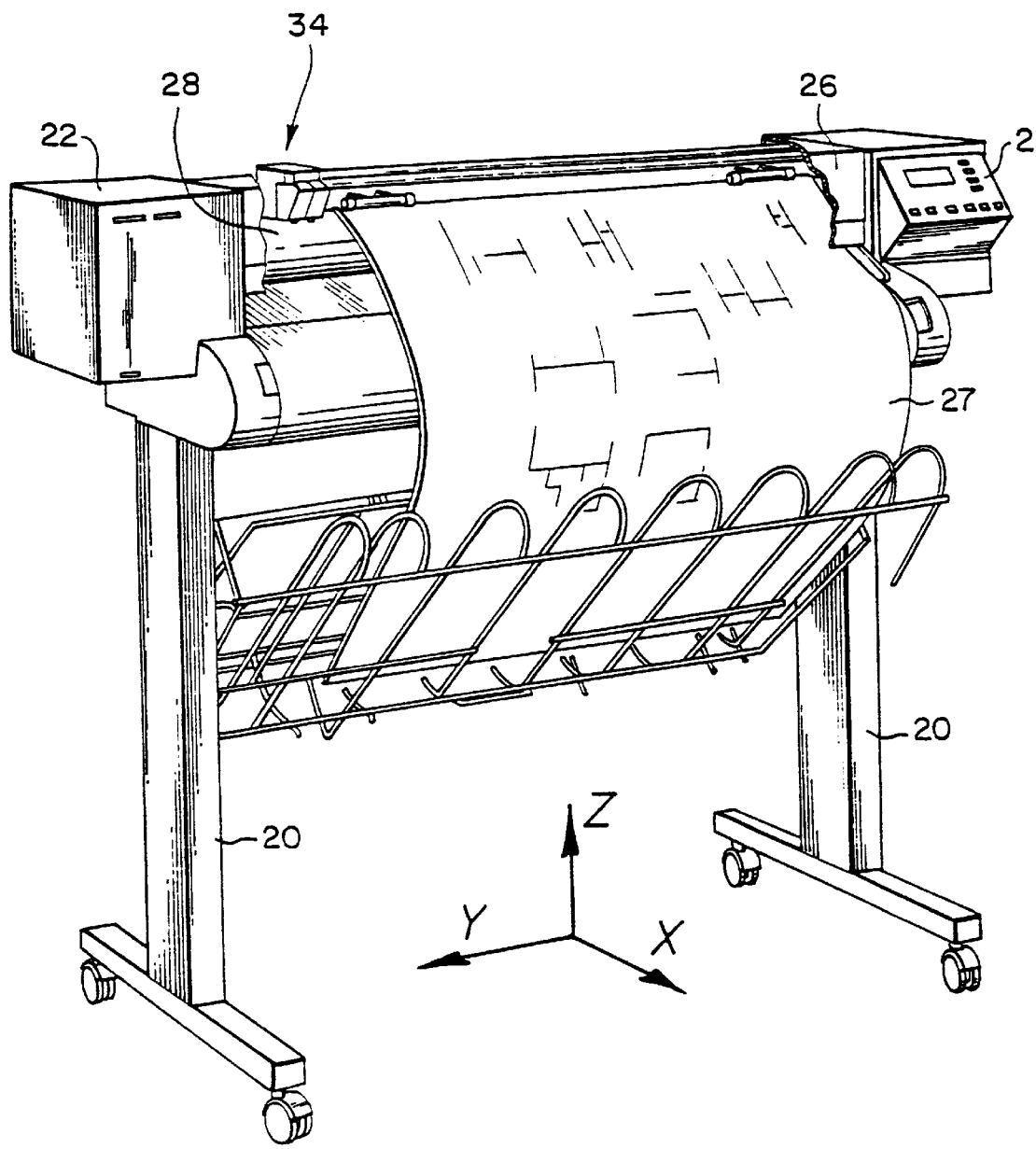
FIG. 1 is a schematic perspective view of a large format printer/plotter, showing multiple print cartridges mounted on a carriage in accordance with a presently preferred embodiment of the invention.
Figure 2:
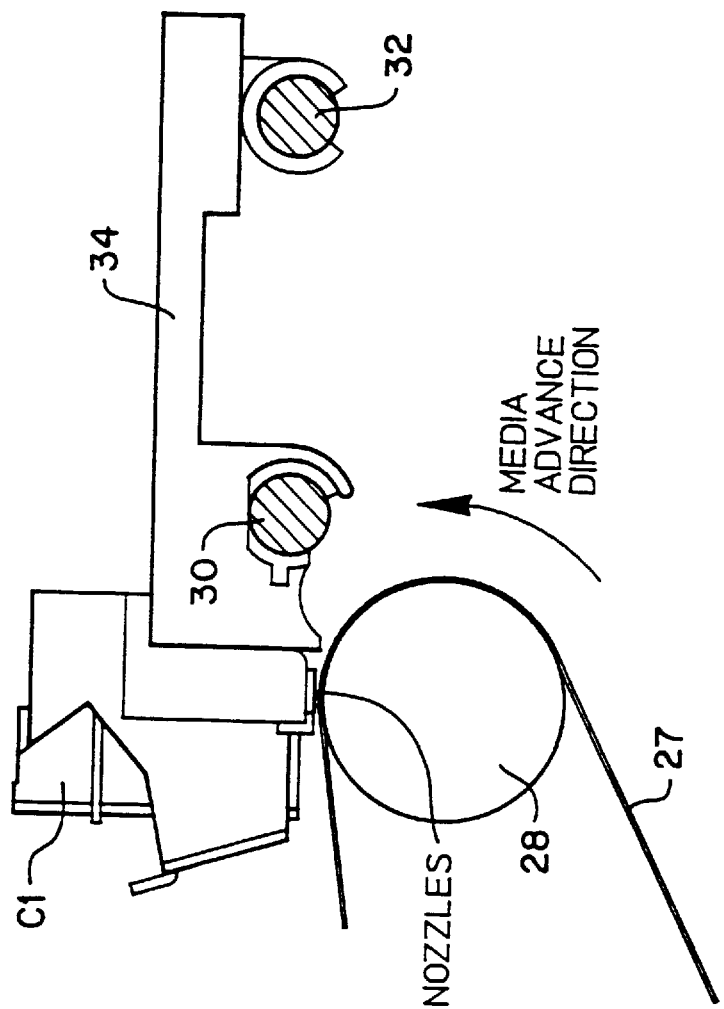
FIG. 2 is a schematic sectional view showing the carriage of FIG. 1 riding on two guide rods with removable print cartridges located forwardly of the guide rods.

FIG. 1 is a schematic perspective view of a large format printer/plotter which incorporates the features of the present invention. The printer/plotter has a chassis supported from the floor by a pair of spaced legs 20. A housing includes printhead service station 22, a control panel 24, and a protective cover 26. The printer/plotter can handle large format media 27 which is either sheet-fed or roll-fed, including paper, vellum or film. As seen in the broken away section at the top of FIG. 1, a platen roller 28 extends transversely in the Y direction to provide a support and printing path at its upper surface for the medium upon which printing is to take place. Front and rear slider rods 30, 32 support a transversely movable print head carriage 34 having a plurality of thermal inkjet printheads mounted thereon which are positioned a precise distance above the platen roller 28. In order to assure high quality print resolution, the slider rods 30, 32 must be adequately supported and held straight. The details of a presently preferred slider rod support structure are described in copending application Ser. No. 07/784,282 entitled LOW COST RIGID GUIDEWAY AND SUPPORT STRUCTURE FOR A PRINTER PLOTTER CARRIAGE filed Oct. 29, 1991 now issued as U.S. Pat. 5,195,836,which is assigned to the same assignee as the present application and which is incorporated herein by reference. The slider rods enable a thermal inkjet printhead carriage traveling on the rods to maintain a constant and precise spacing from the platen roller as the carriage traverses back and forth across the print medium.

Figure 3:
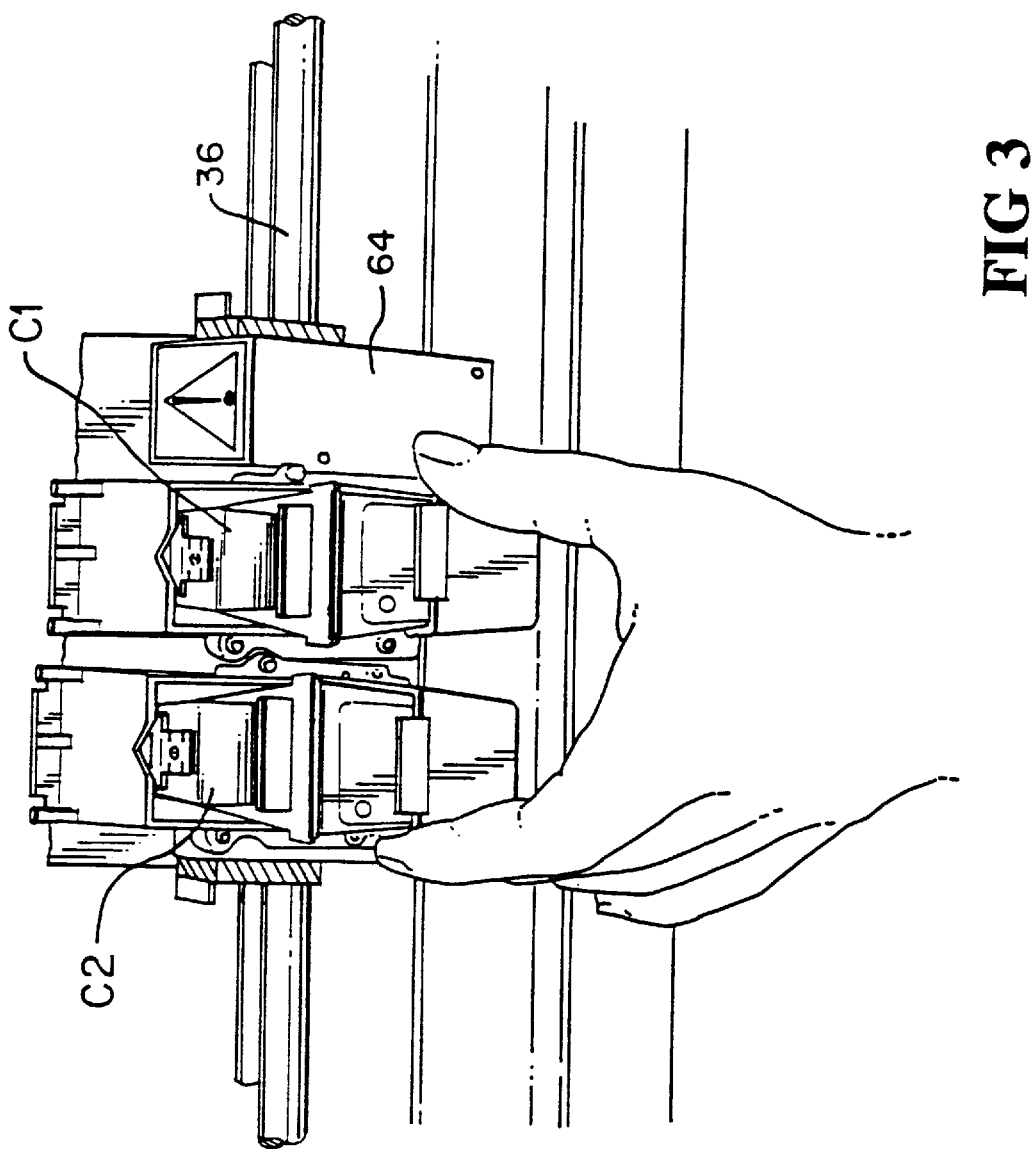
FIG. 3 is a front view showing two virtually identical print cartridges C1, C2 removably mounted on the carriage of FIG. 2 alongside a print-image sensor also mounted on the carriage, with an encoder strip passing through the carriage.
Figure 4B:
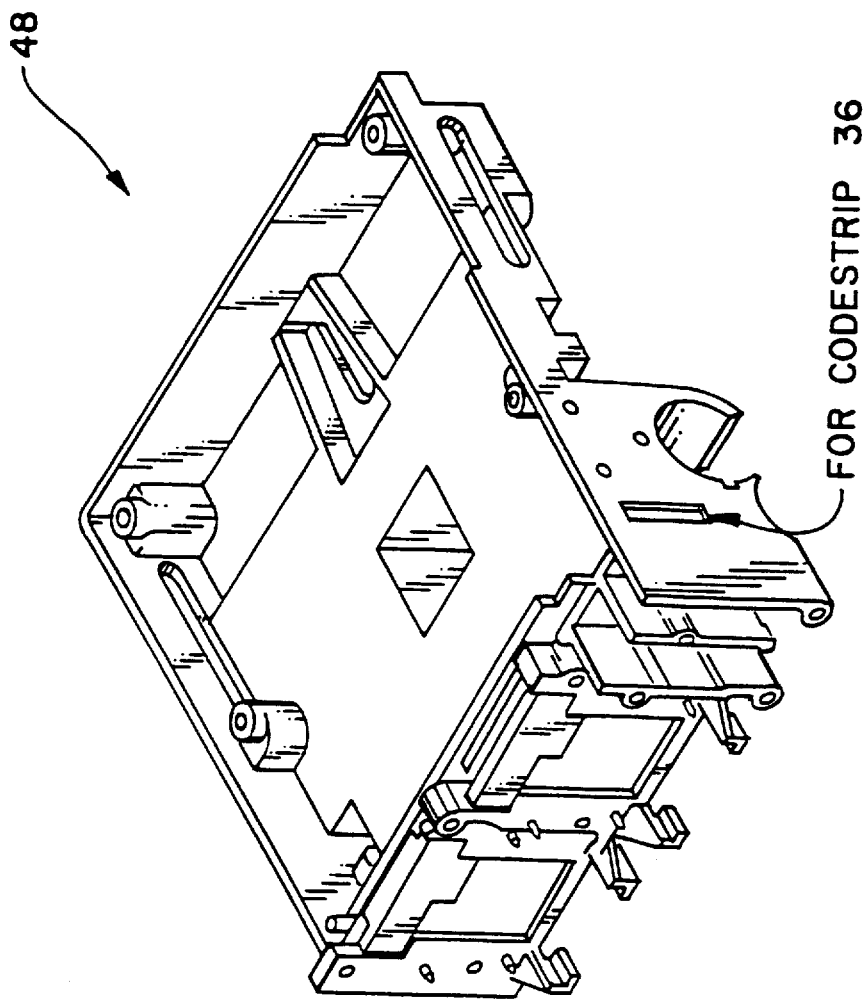
FIG. 4B is a right front view of a carriage shell.
Figure 10:
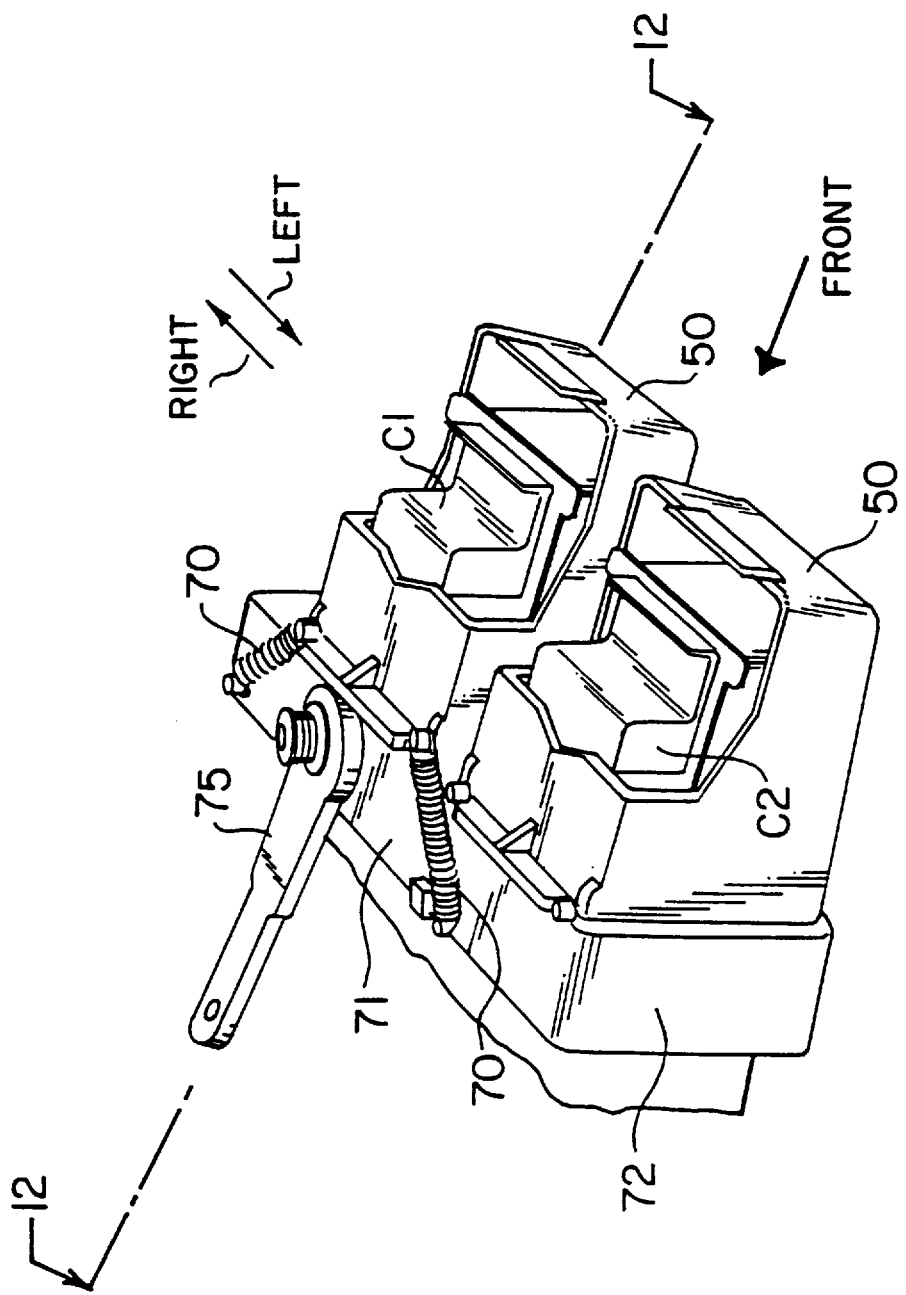
FIG. 10 is a fragmented perspective view of the front of a carriage with virtually identical print cartridges C1, C2 each mounted in a chute of FIG. 9, with a positioning cam engaging the chute holding print cartridge C1.

The automatic determination of printhead/carriage position along the Y direction is provided by a codestrip 36 which is threaded through the carriage 34 in order to pass through a slotted sensor 38 (see FIGS. 3 and 10). The details of a presently preferred codestrip are described in copending application Ser. No. 07/785,376 entitled IMPROVED CODESTRIP IN A LARGE-FORMAT IMAGE-RELATED DEVICE filed Oct. 30, 1991, now issued as U.S. Pat. No. 5,276,970, which is assigned to the assignee of the present application and which is incorporated herein by reference. The sensor 38 is mounted on the underside of a circuit board 40 disposed on top of the carriage in a forward position on a narrow extension of the board. Also mounted on the board are electronics for operation of the sensor 38 as well as electronics for actuation of the printheads C1, C2. A rear interconnect plug 39 is used for transmitting signals from the carriage circuit board 40 to the main electronics board (not shown) of the printer/plotter.

Figure 7A:
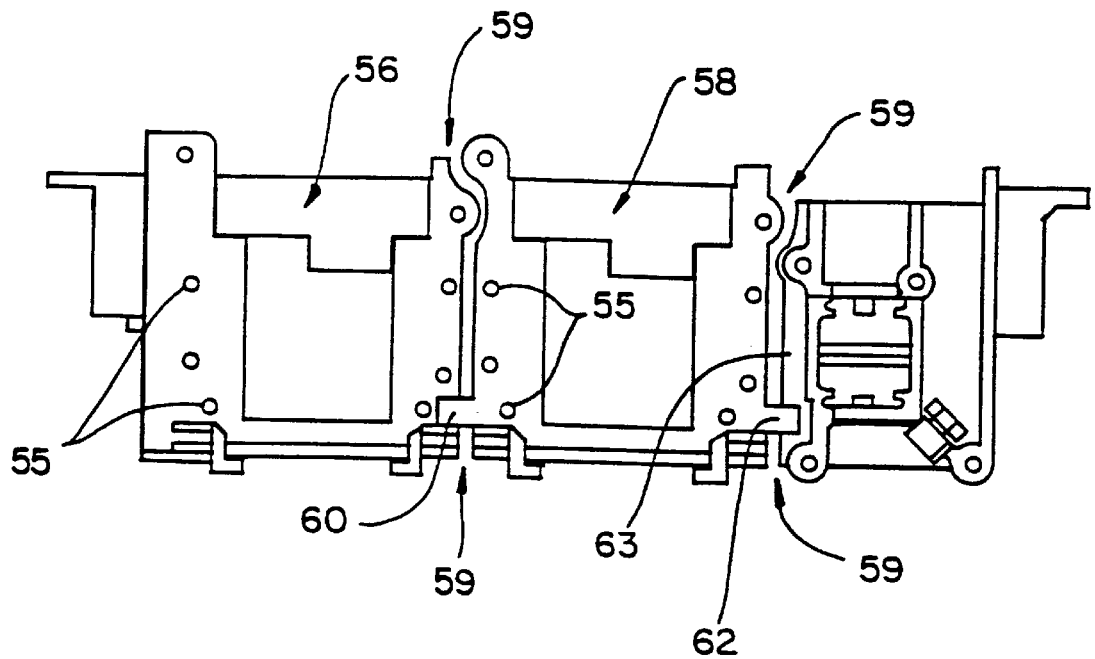
FIG. 7A is a front view of a carriage shell.
Figure 7B:
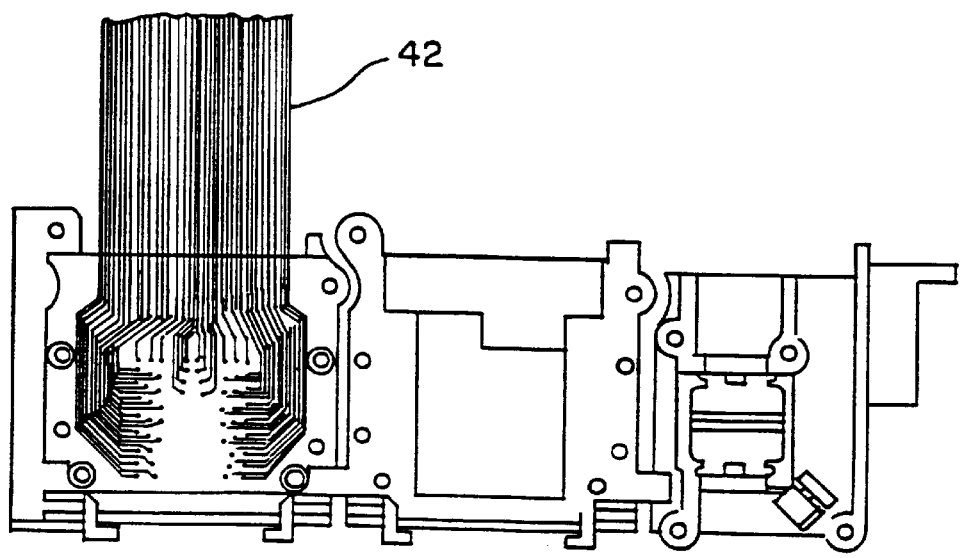
FIG. 7B is the same view with a flex circuit attached to the rigid mounting plate for print cartridge C2.

Generally speaking, the invention is not limited to only two offset printheads, but is also applicable to additional numbers of printheads offset from each other in the X direction in order to achieve wider print swaths for a single traverse of the carriage in the Y direction. As best shown in FIG. 6, the invention preferably provides for a plurality of substantially identical printheads 41 to be separately actuated through respective flex circuits 42 having solder interconnect pads 43 for electrical engagement with matching interconnects 44 on the printhead. In the preferred embodiment the flex circuits pass over the codestrip and rearwardly to their attachment junction 46 on the circuit board 40. The flex circuits are bent (see FIG. 5) to provide a tunnel-like passage 45 for the codestrip 36 as the flex circuits pass between their rearward attachment junctions 46 on the circuit board 40 to their generally vertical position mounted on a carriage shell 48 (see FIG. 7B). The printed circuit board 40 is mounted directly on top of the carriage shell.

Figure 13:
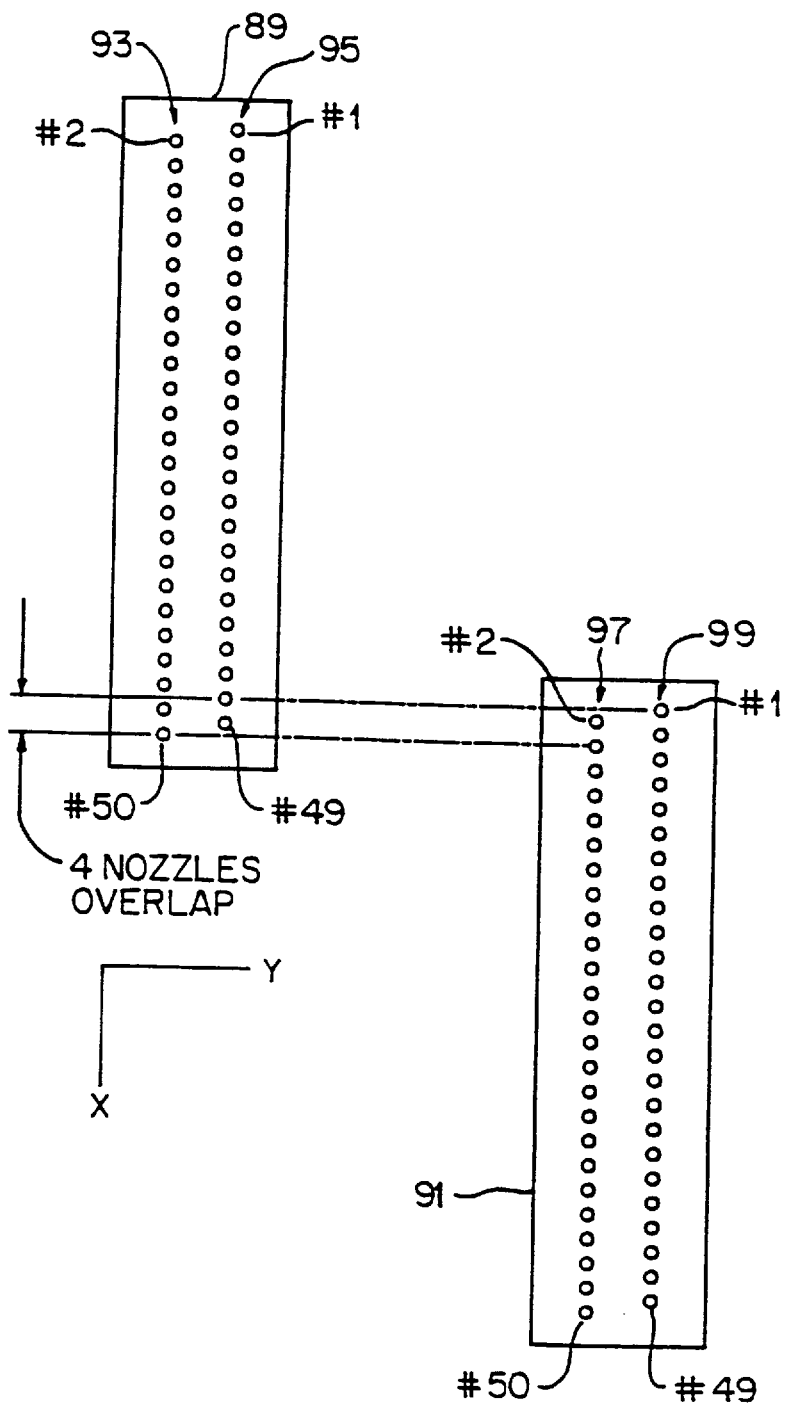
FIG. 13 is a schematic plan view showing the general arrangement of the nozzle arrays of the print cartridges C1, C2.

The first and second cartridges C1, C2 are side by side along the carriage axis (Y direction) and are offset relative to each other along the media scan axis (X direction), and can have overlapping nozzle rows along the media scan axis (see FIG. 13). Certain of the overlapping nozzles are electronically disabled in order to bring the remaining enabled nozzles into proper relationship with the nozzles of the other cartridge in the X direction. The fact that FIG. 13 shows overlapped nozzles from both C1 and C2 to be directly aligned in the Y direction means that the mechanical alignment through the cam-actuated position adjustment of print cartridge C1 has already taken place. It is to be noted that although the vertical columns of nozzles (i.e., columns in the X direction) appear schematically in FIGS. 13–14 to be in a straight line, the nozzles in each quadrant constituting a separate primitive (in other words, a quadrant in formed by a group of 12 or 13 nozzles fed from the same ink supply channel) are slightly staggered apart in the Y direction since only a single nozzle in each primitive can be fired at any single point in time). The presently preferred manner of electronically disabling nozzles and/or electronically delaying the firing of nozzles in order to obtain high quality print registration is described in copending application Ser. No. 07/786,326 entitled FAST FLEXIBLE PRINTER/ PLOTTER WITH ALIGNMENT CORRECTION filed Oct. 31, 1991 in the name of Chen, Corrigan and Haselby, now abandoned which application is assigned to the assignee of the present application and is incorporated herein by reference.

Figure 9:
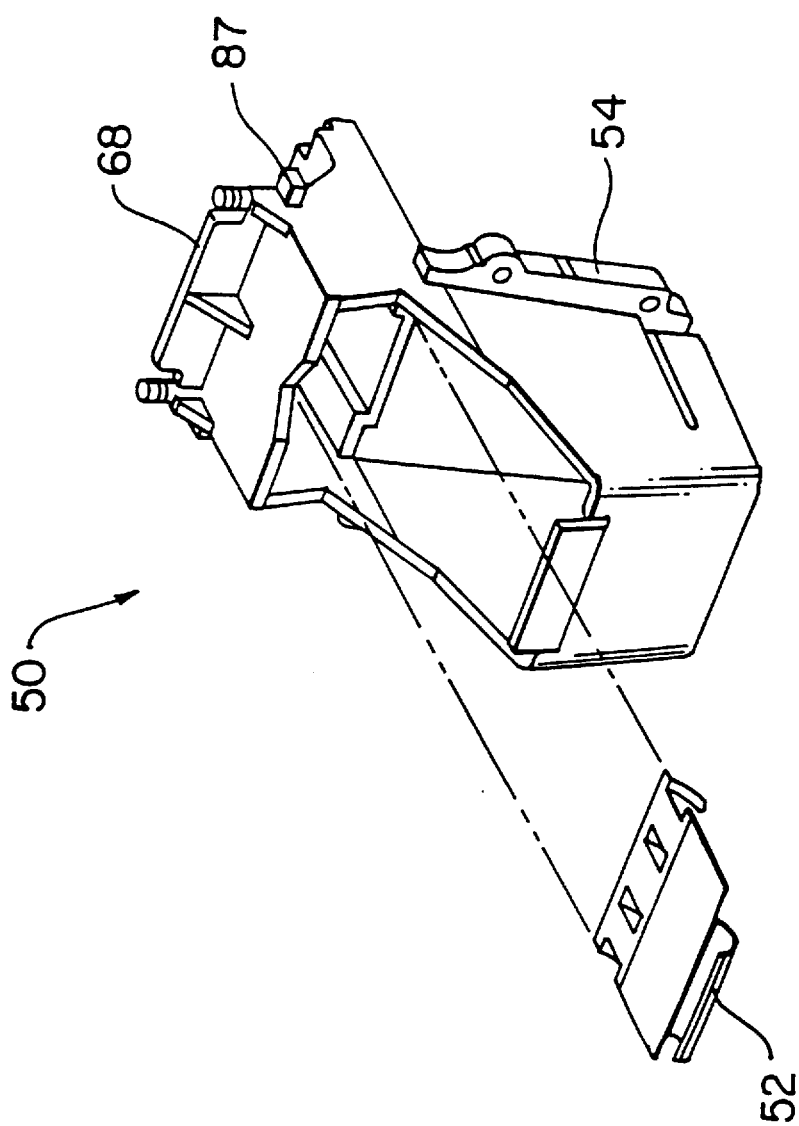
FIG. 9 is a perspective view of a chute for holding a print cartridge.

The structure of a chute 50 for mounting a pen cartridge such as the DeskJet brand of thermal inkjet printhead of Hewlett-Packard Company is shown in FIG. 9. In the illustrated embodiment, identical chutes 50 are used for mounting both cartridges C1, C2. Each chute includes a spring clip 52 for securely holding the cartridge, and a flange 54 having screw holes which match corresponding screw holes on the carriage shell. Matching pins 55 also fit into corresponding holes (not shown) to securely position each chute on the carriage shell 48 after the interconnect pad 43 on the forward end of the flex circuit 42 has been placed on a mounting plate (See FIG. 7B) so as to be sandwiched underneath the chute. The print cartridges C1, C2 are each separately manually insertable and manually removable from their respective chutes, in a conventional manner well known for DeskJet print cartridges.

A chute for cartridge C2 is secured to the carriage on rigid mounting plate 56, while a chute for cartridge C1 is secured to the carriage on flexible mounting plate 58. As best shown in FIG 8, mounting plates 56 and 58 are displaced apart from each other in media scan axis (X direction) in order to position the first enabled row of print elements on one print cartridge to be offset from the last enabled row of print elements of another print cartridge (see FIGS. 13–14). The flexibility of the mounting plate 58 for cartridge C1 is provided by a pair of matching flexible support bars 60, 62 located respectively at the lower left rear and the lower right rear of the mounting plate 58. The short bars extend in a direction generally parallel to the Y direction, with the left bar 60 being integrally attached to the rigid mounting plate 56, and the right bar 62 being integrally attached to a casing 63 for a print-image sensor unit 64. These two bars constitute the only structural connection between the first mounting plate and the rest of the carriage structure, therefore leaving the flexible mounting plate 58 in a suspended position (note the gap 57 behind and the side gaps 59 adjacent flexible mounting plate 58) and subject to certain limited rotation about a pivotal axis 65. In contrast, rigid mounting plate 56 is integrated as part of the carriage shell through rigid arms 66.

The top of each chute includes a cam follower flange 68. When a chute is mounted on the flexible mounting plate 58, the flange 68 is biased rearwardly against a position adjustment cam 69 by a pair of retaining springs 70 attached respectively between the upper rear left and upper rear right of the chute to a cam support base 71 which is fixedly attached by its downward legs 72 to the left and right sides of the carriage shell. The springs are angled outwardly relative to each other in order to allow sufficient space for the cam position adjustment mechanism.

Figure 11A:
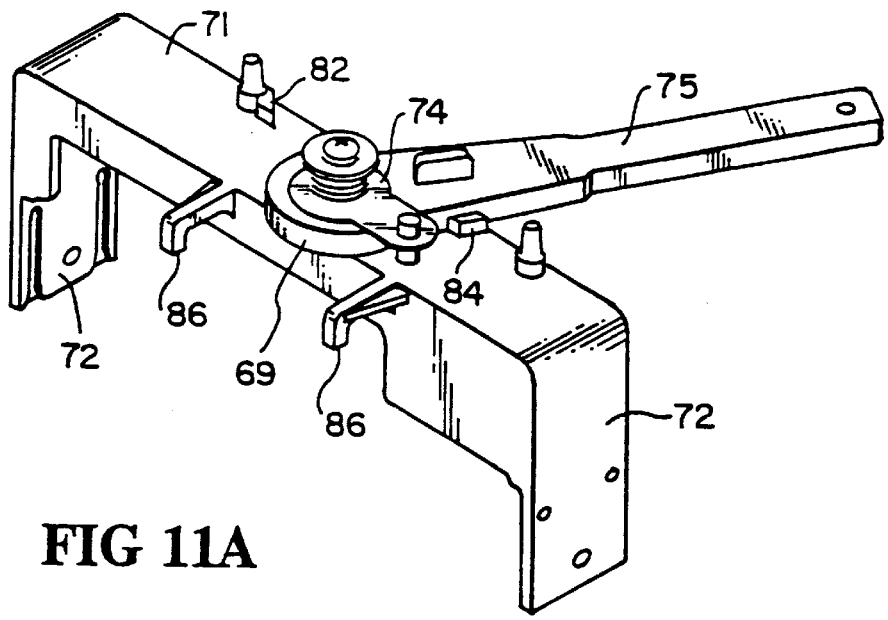
FIG. 11A is a perspective view showing the details of the positioning cam of FIG. 10 mounted on a base.
Figure 11B:
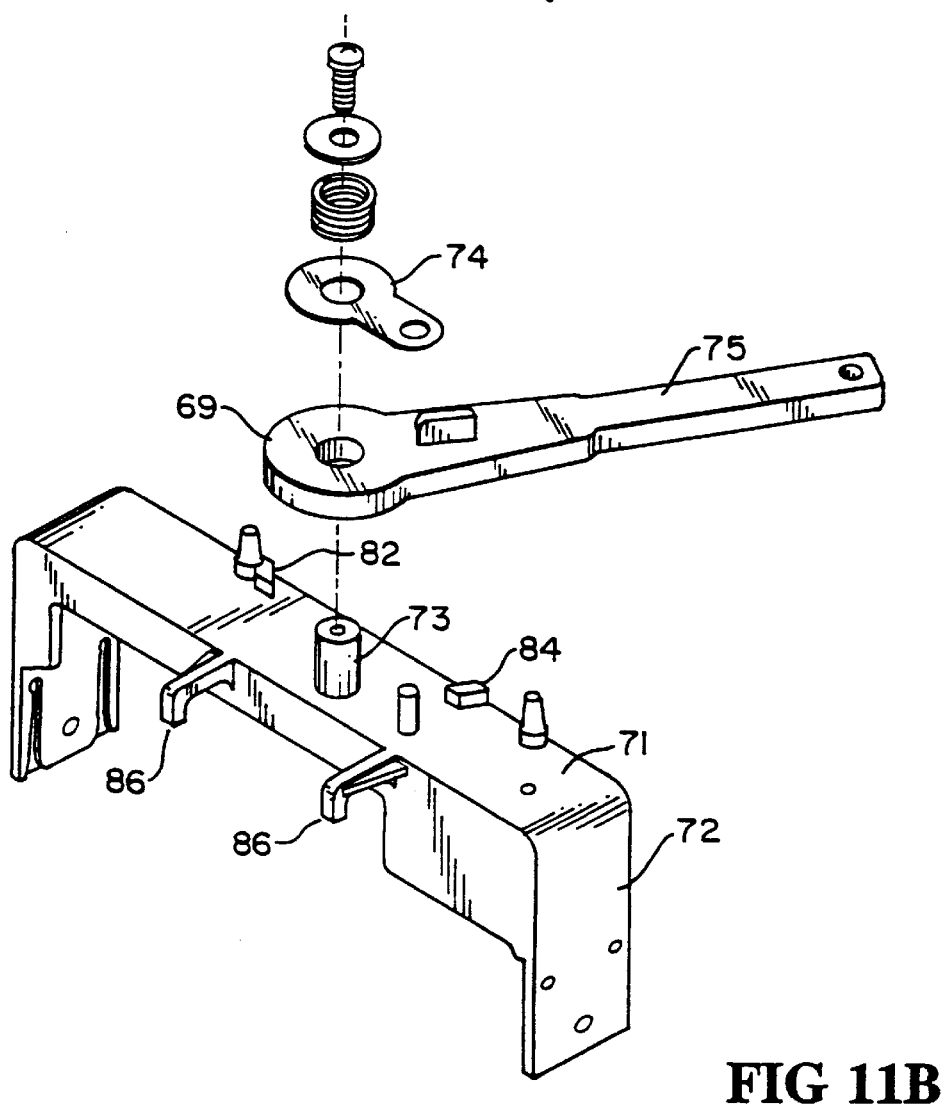
FIG. 11B is an exploded view of FIG. 11A.

The adjustment cam is rotatably mounted on a pin 73 on the support base, and is held down by a spring-loaded washer 74 (See FIG. 11B). The cam is shaped so as to increase the distance between the cam pin 73 and the chute with increased counterclockwise rotation of the cam based on force applied to the cam lever 75. The details of a preferred linkage to the cam lever 75 are described in copending application Ser. No. 07/786,146 entitled PRINT CARTRIDGE CAM ACTUATOR LINKAGE filed Oct. 31, 1991 in the name of Nguyen, now issued as U.S. Pat. No. 241,325 which application is assigned to the assignee of the present application and is incorporated herein by reference.

Figure 12:
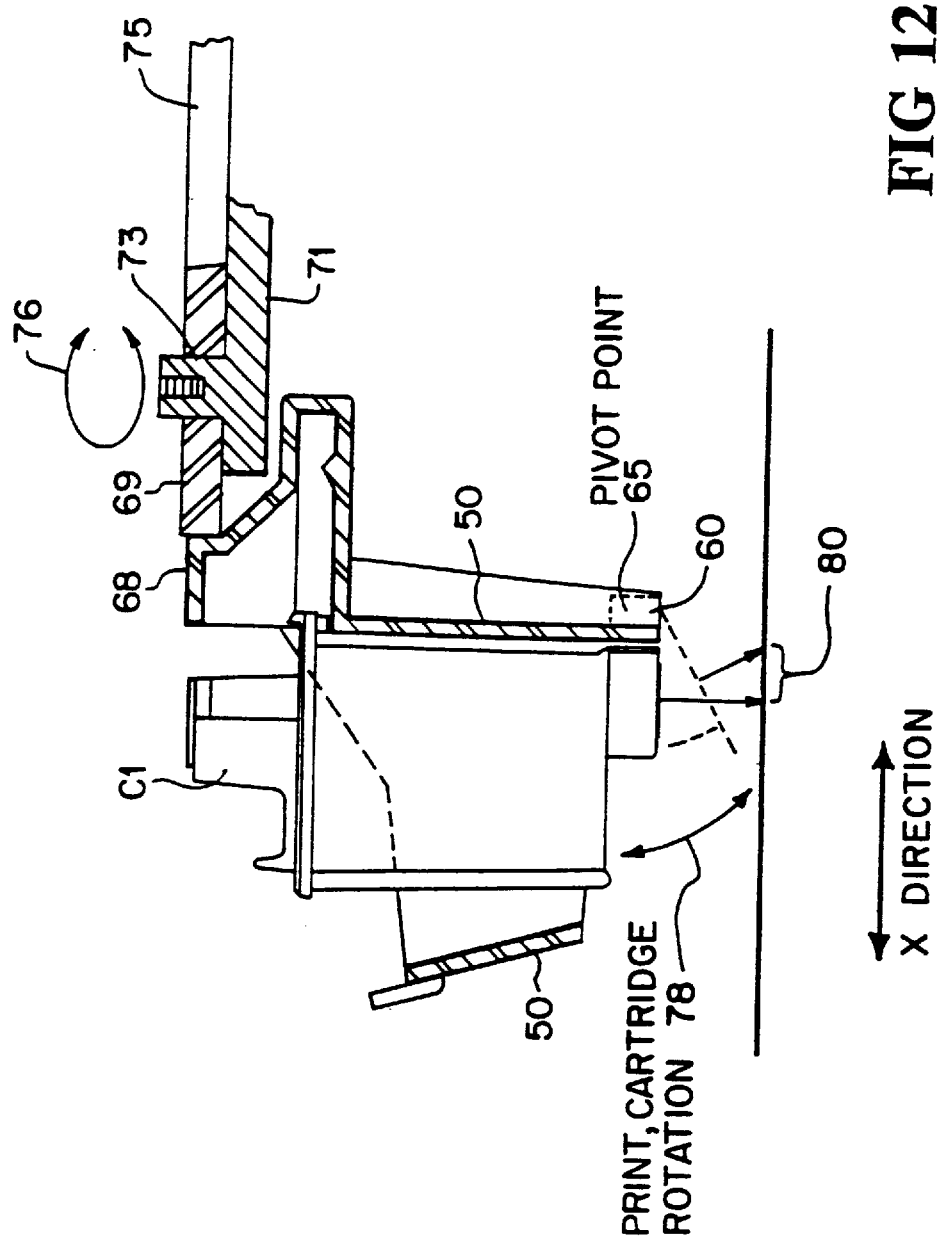
FIG. 12 is a partially sectional view which is taken along the line 12—12 in FIG. 10, showing the manner of cam engagement of the chute holding print cartridge C1.

As best shown in FIG. 12, rotation 76 of the cam 69 causes proportional rotation 78 of the chute about the pivot axis 65. This changes the position of the cartridge C1 to vary the offset with cartridge C2 in the X direction, and also changes the direction of trajectory for ink as shown in the exaggerated schematic diagram at the bottom of FIG. 12 so as to move the ink drop location a distance 80 in the X direction. In order to prevent excessive rotation which might break the torsion bars 60, 62, there are cam stops 82, 84 provided on the cam support base, as well as additional stops 86 projecting forwardly from the top of the cam support base which engage lateral projections 87 on the chute.

In the preferred embodiment which uses DeskJet brand of print cartridges of Hewlett-Packard Company, each printhead has two columns of inkjet nozzles on each nozzle plate 89, 91. Thus four columns 93, 95, 97 and 99 of nozzles are provided. The first and second columns 93 and 95 are provided by cartridge C2 and the third and fourth columns 97 and 99 are provided by cartridge C1. Each printhead has fifty (50) nozzles each in a different X-direction position or row. Printhead C2 has twenty-five nozzles in the first column 93 commonly referred to as even numbered nozzles #2, #4, . . . #50 and twenty-five nozzles in the second column commonly referred to as odd numbered nozzles #1, #3, . . . #49. These nozzle ID #s therefore identify their row position. Likewise, printhead C1 has fifty (50) nozzles in the same array, with its first column 97 having nozzles in the even numbered rows and its second column 99 having nozzles in the odd numbered rows. Since the nozzles in each column are offset from each other in the X direction, each nozzle defines a unique and separately addressable row. Therefore, the row address and the column address uniquely define the position of every nozzle in both pen cartridges. By electronically disabling the overlapping nozzles, each nozzle in the entire array formed by both cartridges defines a unique and separately addressable row, thereby simulating a single wide-swath print cartridge. Of course this same technique would apply to multiple cartridges of more than two which would all be mounted to be offset from each other in the X direction.

Figure 14:
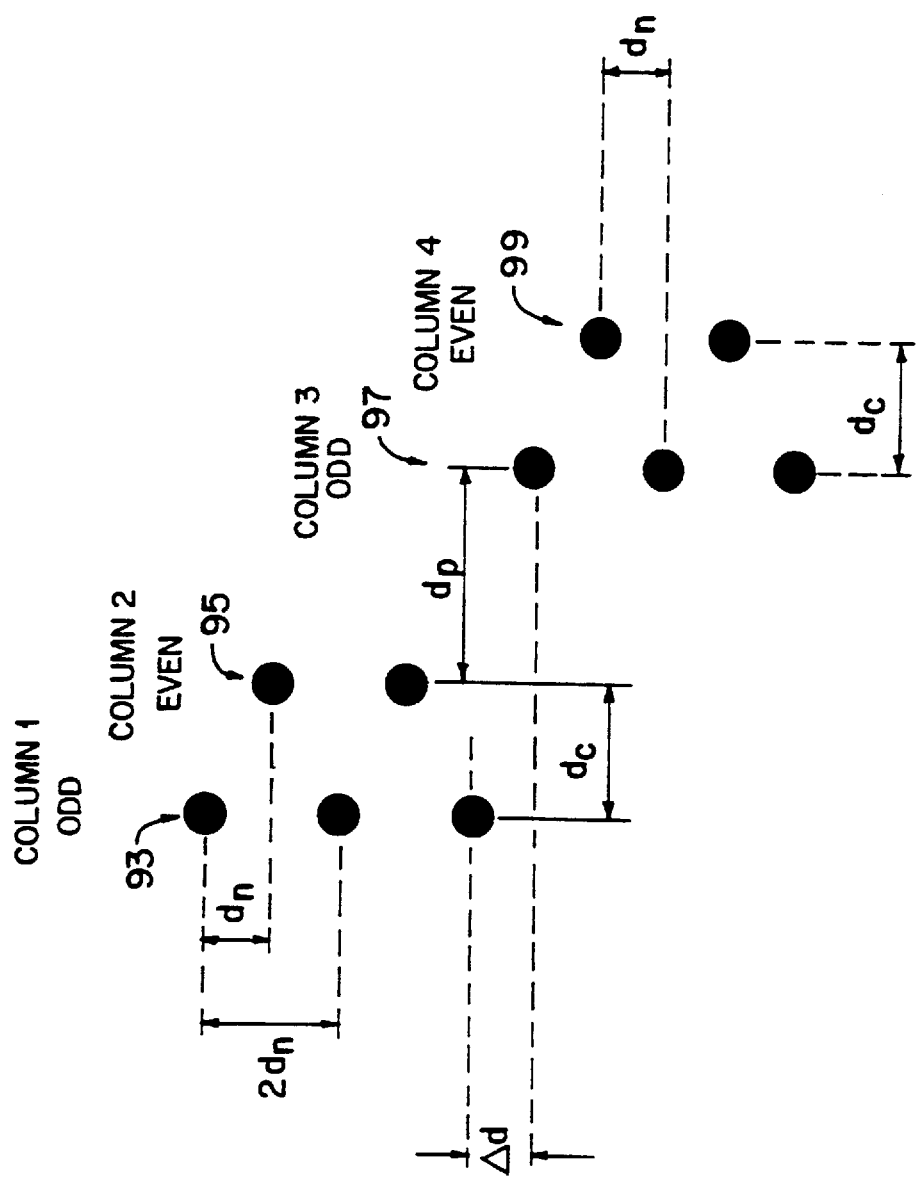
FIG. 14 is a schematic plan view showing the relative positioning of the nozzles of FIG. 13 in the vicinity of the junction between print cartridges C1, C2.

FIG. 14 illustrates the manner of measuring the nozzle offset dn, the column offset dc, the pen offset dp in the Y direction, and the inter-pen nozzle offset delta-d in the X direction. When the distance delta-d is greater than nozzle offset dn, the cam is rotated to lessen the offset between pen cartridges C1 and C2 in the X direction. When the distance delta-d is less than nozzle offset dn, the cam is rotated in the opposite direction to increase the offset between pen cartridges C1 and C2 in the X direction. Although the preferred embodiment provides for 3–4 rows of nozzle overlap between cartridges C1, C2 (i.e., two rows on each, print cartridge C1, C2), it is also possible to have no overlap as shown in FIG. 14 and still achieve the necessary mechanical adjustment by the cam. However, by using the overlapping nozzle technique, the amount of mechanical adjustment required is assured to be within certain minimal ranges, i.e., no more than ½ of the nozzle offset dn.

It is to be understood that while a preferred illustrative embodiment of the invention has been shown and described, various changes will be evident to those skilled in the art, which will nevertheless still be included within the spirit and scope of the invention as defined the following claims.

I claim:

1. A printer/plotter having multiple printheads which move along a carriage axis to apply dots to media which is progressively advanced in a media advance direction along a media axis, comprising:

carriage means for holding multiple printheads which are each separately mountable on said carriage means, and for providing electrical interconnection to said multiple printheads respectively through matching flex circuit conductive pads;

means coupled to said carriage means for said carriage means along the carriage axis;

first mounting means on said carriage means for removably holding a first printhead having multiple printing elements;

second mounting means on said carriage means for removably holding a second printhead having multiple printing elements in an offset position displaced from said first printhead along the media axis; and adjustment means operatively connected to at least one of said first and second printheads for locating the offset position of said second printhead such that an activated group of said printing elements of said first printhead and an activated group of said printing elements of said second printhead traverse respective non-overlapping print regions as said carriage means is scanned along the carriage axis.

2. The printer/plotter of claim 1 wherein said first printhead and said second printhead are thermal ink jet printheads.

3. The printer/plotter of claim 1 further including additional mounting means for removably holding additional printheads at positions displaced from said first printhead and said second printhead and with said additional printheads offset from each other along the media axis.

4. The printer/plotter of claim 1 wherein said adjustment means causes certain of said printing elements of said first and said second printheads to be electronically disabled.

5. A printer/plotter having multiple printheads which move along a carriage axis to apply dots to media which is progressively advanced in a media advance direction along a media axis, comprising:

carriage means for holding multiple printheads which are separately mountable on said carriage means in individual chutes, respectively, spaced apart from each other in the carriage axis normal to the media advance direction, each chute having flex circuit interconnect pads for providing electrical interconnection to one of said multiple printheads;

means coupled with said carriage means for moving said carriage means along the carriage axis;

first mounting means on said carriage for removably holding a first printhead having multiple printing elements;

second mounting means on said carriage means for removably holding a second printhead having multiple print elements in a position displaced from said first printhead along the media axis; and adjustment means for turning off certain printing elements of one or both of said first printhead and said second printhead so that said printing elements of said first printhead and said printing elements of said second printhead that are not turned off traverse respective non-overlapping print regions as said carriage means is scanned along the carriage axis.

6. The printer/plotter of claim 5 further including additional mounting means for holding additional printheads at positions displaced from said first printhead and said second printhead and with said additional printheads offset from each other along the media axis.

7. A printer/plotter having an array of individual print elements on multiple printheads, comprising:

a platen for supporting media which is advanced in a media advance direction along a media axis;

a carriage spaced over said platen in order to traverse across the media along a carriage axis;

motor means coupled to said carriage for moving said carriage;

a first printhead removably mounted on said carriage, said first printhead having a first array of print elements activated through interconnect pads on a flex circuit on said carriage;

a second printhead removably mounted on said carriage said second printhead having a second array of print elements activated through interconnect pads on a flex circuit on said carriage;

mounting means on said carriage for holding said second printhead in a position displaced from said first printhead along the media axis as well as in spaced apart relationship from said first printhead along a carriage scan axis;

alignment means for determining and maintaining the position of said second printhead relative to said first printhead such that the first and second arrays of print elements are non-overlapping along the media axis, and for causing a first group of enabled print elements of said first printhead and a second group of enabled print elements of said second printhead to traverse respective non-overlapping print regions as said carriage is scanned along the carriage axis.

8. The printer/plotter of claim 7 wherein said first printhead and second printheads have substantially identical arrays of print elements.

9. The printer/plotter of claim 7 wherein an enabled print element of said second printhead that is closest to the enabled first array of said first printhead along the media axis and an enabled print element of said first printhead that is closest to the enabled second array of said second printhead along the media axis are offset relative to each other along the media axis by a predetermined distance that is substantially equal to the distance along the media axis between adjacent print elements in said first and second printheads.

10. The printer/plotter of claim 7 wherein said first printhead and second printhead comprise thermal ink jet printheads and said printing elements comprise nozzles.

11. The printer/plotter of claim 7 wherein said alignment means includes separate offset mounting plates on said carriage for each of said printheads.

12. A printer/plotter having an array of individual print elements on multiple printheads, comprising:

a platen for supporting media which is advanced in a media advance direction along a media axis;

a carriage spaced over said platen which traverses the media along a carriage axis;

a first printhead removably mounted on said carriage, said first printhead having a plurality of print elements activated through interconnect pads on a flex circuit on said carriage;

a second printhead separate from said first printhead and removably mounted on said carriage, said second printhead having a plurality of print elements activated through interconnect pads on a flex circuit on said carriage;

a third printhead separate from said second and said first printheads and removably mounted on said carriage, said third printhead having a plurality of print elements activated through interconnect pads on a flex circuit on said carriage;

mounting means for holding said first and second and third printheads in respective positions displaced from each other along the media axis as well as spaced apart from each other along the carriage axis; and alignment means for providing an enabled array of selected print elements of said first, second and third printheads such that the respective enabled arrays are non-overlapping along the media axis, whereby the enabled print elements of said first printhead and the enabled print elements of said second printhead and the enabled print elements of said third printhead traverse respective non-overlapping print regions as said carriage is scanned in a single pass along the carriage axis.

13. The printer/plotter of claim 12 wherein said first and second and third printheads have substantially identical arrays of print elements.

14. The printer/plotter of claim 12 wherein an enabled print element of said second printhead that is closest to the enabled array of said first printhead along the media axis and an enabled print element of said first printhead that is closest to the enabled array of said second printhead along the media axis are offset relative to each other along the media axis by a predetermined distance that is substantially equal to the distance along the media axis between adjacent print elements in said first printhead and second printhead.

15. The printer/plotter of claim 12 wherein said alignment means includes selection means for turning off certain of said printing elements of said first printhead.

16. The printer/plotter of claim 15 wherein said alignment means includes selection means for turning off certain of said printing elements of said second printhead.

17. The printer/plotter of claim where 16 said alignment means includes selection means for turning off certain of said printing elements of said third printhead.

* * * * *

UNITED STATES PATENT AND TRADEMARK OFFICE
CERTIFICATE OF CORRECTION

PATENT NO. : 5,861,899

DATED : January 19, 1999

INVENTOR(S) : Nguyen, et al.

It is certified that error appears in the above-identified patent and that said Letters Patent is hereby corrected as shown below:

At Column 6, line 26, after "means for" insert --moving--.

Signed and Sealed this

Thirteenth Day of July, 1999

Attest:

Attesting Officer

Q. TODD DICKINSON

Acting Commissioner of Patents and Trademarks